United States Patent
Toda et al.

(10) Patent No.: US 9,267,421 B2
(45) Date of Patent: Feb. 23, 2016

(54) COMBUSTION CHAMBER STRUCTURE FOR ENGINE

(71) Applicant: MAZDA MOTOR CORPORATION, Hiroshima (JP)

(72) Inventors: Tadatomo Toda, Hiroshima (JP); Mitsunori Wasada, Hiroshima (JP); Tadasu Hashiguchi, Hiroshima (JP); Takashi Youso, Hiroshima (JP); Kazuhiro Nagatsu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/345,640

(22) PCT Filed: Aug. 12, 2013

(86) PCT No.: PCT/JP2013/004832
§ 371 (c)(1),
(2) Date: Mar. 18, 2014

(87) PCT Pub. No.: WO2014/030319
PCT Pub. Date: Feb. 27, 2014

(65) Prior Publication Data
US 2015/0167536 A1    Jun. 18, 2015

(30) Foreign Application Priority Data
Aug. 24, 2012    (JP) .................................. 2012-185068

(51) Int. Cl.
*F02B 23/02*    (2006.01)
*F02F 3/24*    (2006.01)
(Continued)

(52) U.S. Cl.
CPC .................. *F02B 23/02* (2013.01); *F02B 11/00* (2013.01); *F02B 23/08* (2013.01); *F02B 23/10* (2013.01);
(Continued)

(58) Field of Classification Search
CPC .......... F02B 19/14; F02B 23/02; F02B 23/10; F02B 23/0627; F02B 23/0651; F02B 23/063; F02B 23/0675; F02B 23/0696; F02B 23/0693; F02F 3/24; F02F 3/28; F16J 1/00; F16J 10/02
USPC ............................................... 123/193.6, 661
See application file for complete search history.

(56) References Cited

U.S. PATENT DOCUMENTS 5,115,774 A      5/1992  Nomura et al.
5,285,755 A *    2/1994  Regueiro .................... 123/193.6
(Continued)

FOREIGN PATENT DOCUMENTS

AT          005720 U1   10/2002
DE          69100803 T2  4/1994
(Continued)

OTHER PUBLICATIONS
International Search Report; PCT/JP2013/004832; Oct. 29, 2013.
(Continued)

*Primary Examiner* — Lindsay Low
*Assistant Examiner* — Grant Moubry
(74) *Attorney, Agent, or Firm* — Studebaker & Brackett PC

(57) ABSTRACT

The axial line of an intake valve is inclined, and a gap between a piston crown surface and a valve head of the intake valve expands in accordance with the approach of the crankshaft axis. A relationship of G2>G1 is fulfilled, where G1 stands for a minimum gap between the lower surface of the cylinder head that is positioned between the intake valve and the exhaust valve facing the intake valve, with the crankshaft axis being interposed therebetween, and the piston crown surface in a top dead center, and G2 stands for a gap at a position that is the closest to the crankshaft axis, from among the gaps between the lower surface of the valve head of the intake valve and the piston crown surface at a center timing of a valve overlap period in which the intake valve and the exhaust valve are both open.

10 Claims, 16 Drawing Sheets

(51) Int. Cl.
*F02B 11/00* (2006.01)
*F02B 23/08* (2006.01)
*F02B 23/10* (2006.01)
*F02F 1/22* (2006.01)
*F02F 3/28* (2006.01)

(52) U.S. Cl.
CPC ............... *F02B 23/101* (2013.01); *F02F 1/22* (2013.01); *F02F 3/24* (2013.01); *F02F 3/28* (2013.01); *F02B 2023/085* (2013.01); *F02B 2023/102* (2013.01); *Y02T 10/12* (2013.01); *Y02T 10/125* (2013.01)

(56) References Cited

U.S. PATENT DOCUMENTS

| | | | | |
|---|---|---|---|---|
| 5,309,879 | A * | 5/1994 | Regueiro | 123/286 |
| 5,873,341 | A * | 2/1999 | Smith et al. | 123/193.5 |
| 7,040,279 | B2 * | 5/2006 | Regueiro | 123/254 |
| 7,954,471 | B2 * | 6/2011 | Nishimoto et al. | 123/261 |
| 8,082,908 | B2 * | 12/2011 | Ward | 123/661 |
| 8,151,747 | B2 * | 4/2012 | Phillips | 123/70 R |
| 8,191,528 | B2 * | 6/2012 | Youso et al. | 123/193.1 |
| 2003/0056750 | A1 | 3/2003 | Fuerhapter | |
| 2004/0020457 | A1 * | 2/2004 | Regueiro | 123/276 |
| 2008/0276900 | A1 | 11/2008 | Umierski et al. | |
| 2009/0173307 | A1 | 7/2009 | Youso et al. | |
| 2010/0059016 | A1 * | 3/2010 | Tachibana et al. | 123/307 |

FOREIGN PATENT DOCUMENTS

| | | |
|---|---|---|
| DE | 102005002389 B4 | 4/2009 |
| JP | 05-113120 A | 5/1993 |
| JP | 2001-193464 A | 7/2001 |
| JP | 2007-292060 A | 11/2007 |
| JP | 2008-019803 A | 1/2008 |
| JP | 2009-162154 A | 7/2009 |
| JP | 2012-072730 A | 4/2012 |

OTHER PUBLICATIONS

An Office Action issued by the German Patent Office on Jun. 11, 2015, which corresponds to German Patent Application No. 112013000183.7 and is related to U.S. Appl. No. 14/345,640; with English language translation.

* cited by examiner (CROSS-SECTIONAL POSITION S0)

COMBUSTION CHAMBER STRUCTURE FOR ENGINE

TECHNICAL FIELD

The present invention relates to a combustion chamber structure for an engine performing compressed self-ignition.

BACKGROUND ART

Engines using gasoline-based fuel typically employ a spark ignition system in which an air-fuel mixture is forcibly ignited using a sparkplug. Meanwhile, in order to improve significantly the fuel economy, it has recently been suggested to cause compressed self-ignition of the air-fuel mixture (pre-mixing compressed self-ignition) by increasing the geometric compression ratio of the engine to a high compression ratio equal to or higher than 15 while still using the gasoline-based fuel.

Patent Document 1 discloses an engine of a spark ignition system which is not of the compressed self-ignition system, but in which the geometric compression ratio is still increased to a high value equal to or higher than 13. This engine uses a pentroof combustion chamber. In this engine, where Si1 denotes cross-sectional areas of the combustion chamber in a plurality of mutually parallel virtual cut planes that are parallel to a linear reciprocating direction of the intake valve and pass through the valve head of the intake valve and Si2 denotes an effective opening area (curtain surface area) between the valve head and the valve seat, the shape of the parts of the combustion engine and the like is set such that a relationship Si1≥Si2 is fulfilled in any virtual cut plane at the center timing of the valve overlap period in which the intake valve and the exhaust valve are both open. As a result, the intake air supplied from the circumferential edge of the valve head into the combustion engine can smoothly pass along the lower surface of the valve head. Therefore, scavenging ability and filling efficiency can be increased.

Patent Document 2 discloses a two-cycle diesel engine in which intake air from an intake valve forms a loop flow along the inner wall surface of a cylinder because the axial line of the intake valve is inclined with respect to the cylinder axis.

In order to perform the compressed self-ignition, it is preferred that as homogeneous an air-fuel mixture as possible be formed inside the cylinder, and for this purpose, it is preferred that a fuel injection valve be disposed in the center of the cylinder and the fuel be uniformly injected from the fuel injection valve into the entire cylinder.

However, it is not easy to form a sufficient amount of a homogeneous air-fuel mixture inside the cylinder of an engine with a very high geometric compression ratio, such as described hereinabove. This is because in the engine with a high geometric compression ratio, a gap between the lower surface of the cylinder head and the piston crown surface is extremely small at the top dead center position of the piston and in the vicinity thereof, and scavenging in the overlap period in which the intake valve and exhaust valve are both open is degraded. In particular, where a cavity is formed in the piston crown surface, scavenging inside the cavity becomes insufficient and a sufficient amount of intake air is difficult to supply into the cavity. This is the major reason why the filling efficiency decreases and therefore the output decreases.

Patent Document 1: Japanese Patent Application Publication No. 2009-162154

Patent Document 2: Japanese Patent Application Publication No. H05-113120

SUMMARY OF THE INVENTION

The present invention has been created with the foregoing in view, and it is an objective thereof to provide a combustion chamber structure for a high-compression-ratio engine in which the geometric compression ratio is equal to or higher than 15, the combustion chamber structure enabling sufficient scavenging inside the cavity formed in the central portion of the piston crown surface.

In order to attain the objective, the present invention uses a combustion chamber structure, such as descried hereinbelow, to introduce smoothly the intake air supplied to the combustion chamber, in particular, the intake air supplied to the combustion chamber from the circumferential edge of the valve head of the intake valve on a side that is farther from the cylinder axis, into the cavity.

Thus, the combustion chamber structure in accordance with the present invention includes: a cylinder block having one or more cylinders; a cylinder head that covers the cylinder from one side in a cylinder axis direction; a piston reciprocatingly inserted into the cylinder; intake valves provided at a ratio of two valves per cylinder at one side thereof from among two regions separated by a crankshaft axis; and exhaust valves provided at a ratio of two valves per cylinder at the other side thereof from among the two regions separated by the crankshaft axis, and that is adopted to an engine in which compressed self-ignition is performed in at least a low-load range. The geometric compression ratio of the cylinder is set to 15 or higher, and a cavity is formed in the central portion of the crown surface of the piston. Part of the valve head of each intake valve overlaps the cavity, as viewed in the cylinder axis direction. Valve recesses for preventing interference between the piston and the valve heads of the intake valves are formed in the piston crown surface so as to be connected to the cavity. An axial line of the intake valve is inclined to recede from the cylinder axis with increasing distance from the valve head, as viewed in the cylinder axis direction, and a gap between the piston crown surface and a region which is a part of a lower surface of the valve head, at least on a side that is closer to the crankshaft axis, expands in accordance with approach of the crankshaft axis. A relationship of G2>G1 is fulfilled, where G1 stands for a minimum gap between the lower surface of the cylinder head that is positioned between the intake valve and the exhaust valve facing the intake valve, with the crankshaft axis being interposed therebetween, and the piston crown surface in a top dead center, and G2 stands for a gap at a position that is the closest to the crankshaft axis, from among the gaps between the lower surface of the valve head of the intake valve and the piston crown surface at a center timing of a valve overlap period in which the intake valve and the exhaust valve are both open.

The advantage of the present invention is that in a high-compression-ratio engine in which compressed self-ignition is performed, the filling efficiency can be effectively increased by performing sufficient scavenging inside the cavity.

DESCRIPTION OF EMBODIMENTS

Figure 1:
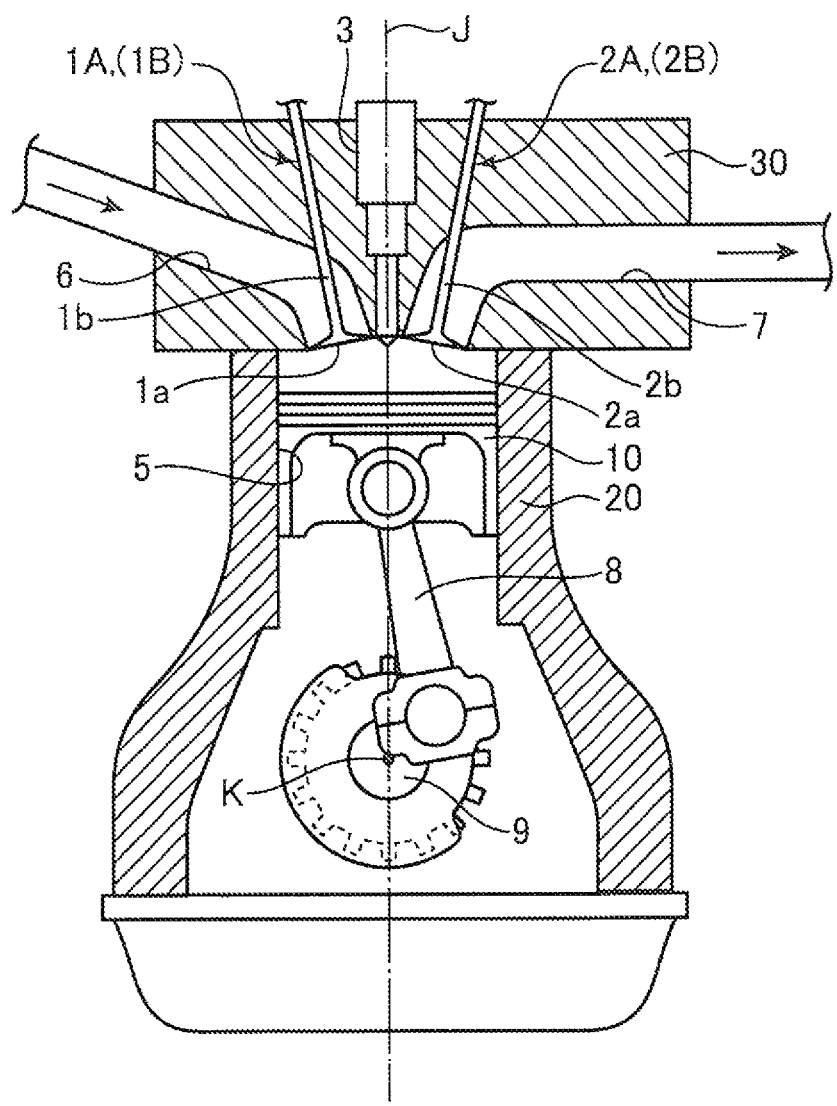
FIG. 1 is a schematic cross-sectional view illustrating a specific example of an engine using the combustion chamber structure in accordance with the present invention.

FIG. 1 shows a schematic configuration of an engine using the combustion chamber structure according to the first embodiment of the present invention. The engine shown in the figure is an inline multicylinder gasoline engine to be installed on an automobile and has a cylinder block 20 having a plurality of cylinders 5 (only one thereamong is shown in FIG. 1) arranged side by side in the direction orthogonal to the sheet of this figure, a cylinder head 30 mounted on the cylinder block 20 so as to cover the cylinders 5 from the upper surface, and a piston 10 reciprocatingly inserted into each cylinder 5. A combustion chamber with a volume changing according to the vertical position of the piston 10 is formed above the piston 10. The piston 10 is connected by a connecting rod 8 to a crankshaft 9, and the crankshaft 9 rotates about an axis in response to the reciprocating movement of the piston 10.

The geometric compression ratio of each cylinder 5, that is, the ratio of combustion chamber volume when the piston 10 is in the top dead center to the combustion chamber volume when the piston 10 is in the bottom dead center is set to be equal to or greater than 15. Any appropriate value of the geometric combustion ratio can be taken, provided that it is equal to or greater than 15, but for example 18 is a more preferred value for the geometric compression ratio.

Figure 2:
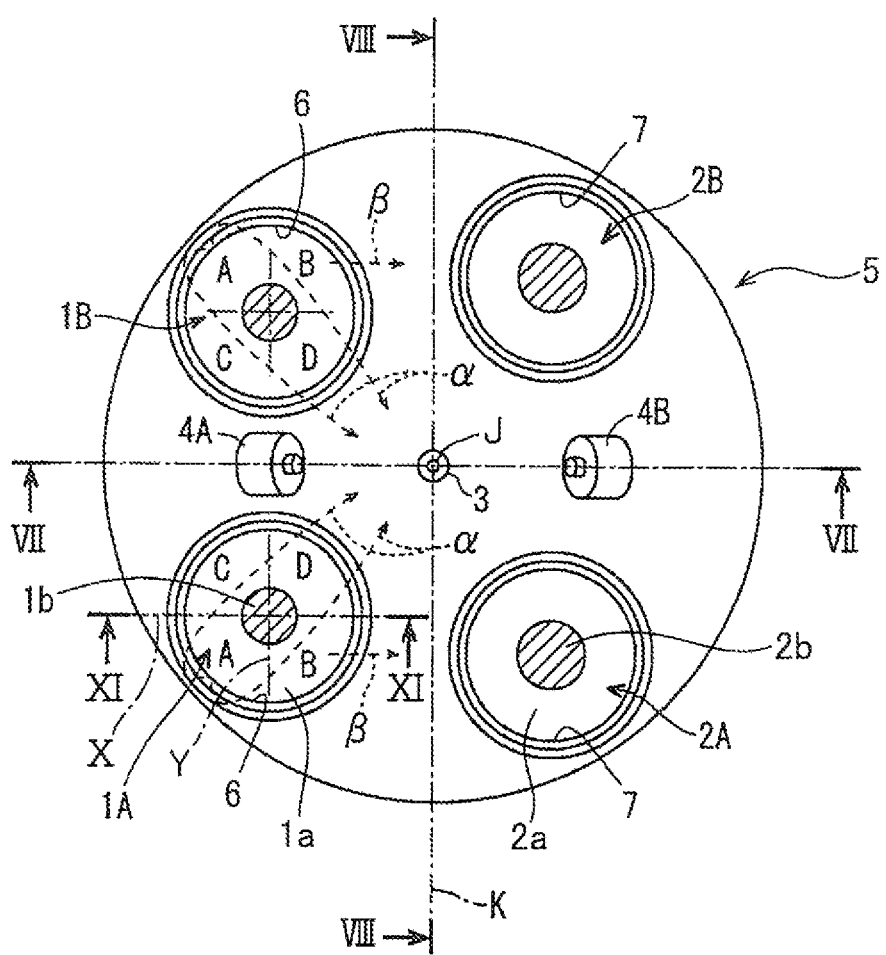
FIG. 2 is a schematic plan view of one cylinder that is taken from one side in the cylinder axis direction (upper side) and illustrates the first embodiment of the present invention.

FIG. 2 is a plan view of one cylinder 5. In FIGS. 1 and 2, the reference numeral J denotes a cylinder axis, which is the central line of the cylinder 5, and the reference numeral K denotes a crankshaft axis, which is the central line of the crankshaft 9. The cylinder axis J and the crankshaft axis K are orthogonal to each other.

In the cylinder head 30, two intake valves 1A, 1B and two exhaust valves 2A, 2B are provided for one cylinder 5. The intake valves 1A, 1B each have a disk-shaped valve head 1a capable of closing the intake port 6 provided in the cylinder head 30, and a valve stem 1b extending upward from the valve head 1a. Likewise, the exhaust valves 2A, 2B each have a disk-shaped valve head 2a capable of closing the exhaust port 7 provided in the cylinder head 30, and a valve stem 2b extending upward from the valve head 2a.

When viewed from one side (upper side) of the cylinder axis J, the intake valves 1A, 1B are provided such as to be arranged along the crankshaft axis K in a region on one side (left side in FIG. 1), where the cylinder 5 is assumed to be divided in two by the crankshaft axis K. Likewise, the exhaust valves 2A, 2B are provided such as to be arranged along the crankshaft axis K in a region on the other side (right side in FIG. 1), where the cylinder 5 is assumed to be divided in two by the crankshaft axis K. The intake valve 1A is disposed opposite the exhaust valve 2A on the other side of the crankshaft axis K, and the intake valve 1B is disposed opposite the exhaust valve 2B on the other side of the crankshaft axis K.

Figure 12:
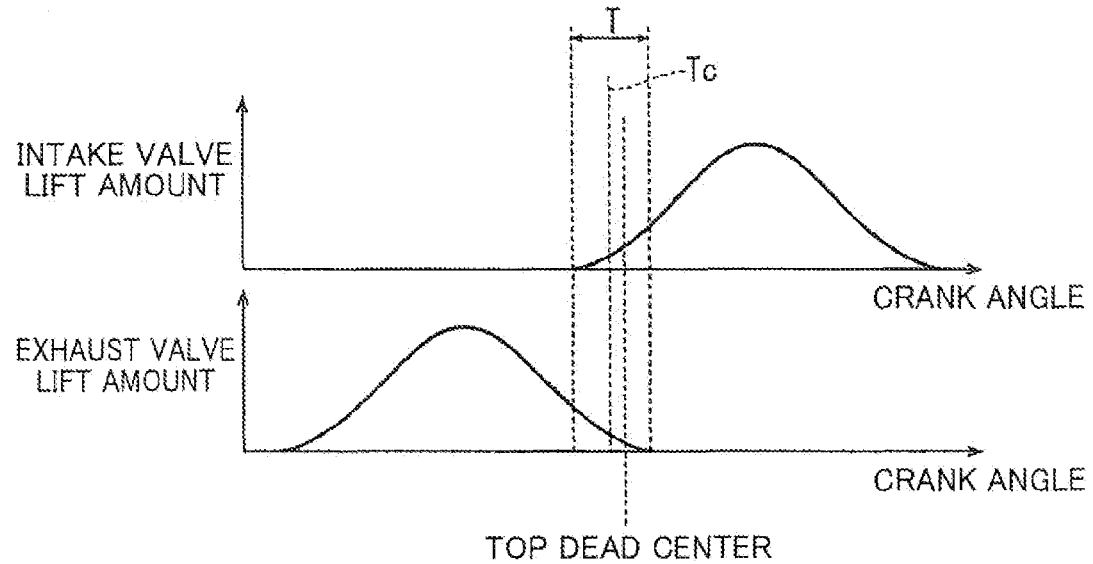
FIG. 12 is a characteristic diagram illustrating a setting example of the overlap period of the intake and exhaust valves.

As shown in FIG. 12, the intake valves 1A, 1B and the exhaust valves 2A, 2B are simultaneously open for a predetermined overlap period of time T including the compression top dead center. One of the reasons for providing such an overlap period of time T in which the intake and exhaust valves are all open is to discharge (that is, scavenge) the burnt gas from the combustion chamber. The reference symbol Tc in the figure denotes the center timing of the overlap period of time T. In the example shown in FIG. 12, the center timing Tc of the overlap period of time is set somewhat on the advance side with respect to the top dead center of the piston.

One fuel injection valve 3 and two sparkplugs (first and second sparkplugs) 4A, 4B are provided for one cylinder 5 in the cylinder head 30. The fuel injection valve 3 is disposed such as to extend in the direction matching the cylinder axis J in each cylinder 5. The first sparkplug 4A is provided between the two intake valves 1A, 1B in each cylinder 5, and the second sparkplug 4B is provided between the two exhaust valves 2A, 2B in each cylinder 5.

Fuel mainly constituted by gasoline is injected from the fuel injection valve 3 in the same manner as in the usual spark ignition engine. The expression "fuel mainly constituted by gasoline" means that fuel including auxiliary components other than gasoline may be also used. In other words, the fuel to be used in the engine of the present embodiment may be fuel with a gasoline content of 100% and a fuel including auxiliary components, such as ethanol, other than gasoline.

In the above-described engine, combustion based on compressed self-ignition, more specifically, combustion based on premixing compressed self-ignition called HCCI (Homogeneous-Charge Compression-Ignition), is performed in a low-load range of the engine.

More specifically, in a low-load range in which the compressed self-ignition is performed, the fuel is injected from the fuel injection valve 3 at a timing sufficiently before the compression top dead center. The injected fuel receives heat as a result of the compression action of the piston 10, while mixing with the intake air supplied into the combustion chamber, and reaches a self-ignition stage at a timing at which the piston 10 moves close to the compression top dead center. The combustion resulting from such compressed self-ignition is performed under a lean atmosphere with a gas air-fuel ratio (represented by G/F) equal to or greater than 20. Here, G stands for a total gas amount (weight) of new air and EGR gas, and F stands for a fuel amount (weight).

In an operation region (that is, a high-load region of the engine) other than the operation region in which the compressed self-ignition is performed, spark ignition is performed in which the air-fuel mixture is forcibly burnt by spark ignition from the sparkplugs 4A, 4B. More specifically, in a high-load region of the engine, the fuel is injected from the fuel injection valve 3 immediately before the compression top dead center, and then ignition energy created by spark ignition from the two sparkplugs 4A, 4B is supplied. The air fuel ratio attained when such spark ignition is performed is sufficiently richer than the air fuel ratio attained when the compressed self-ignition is performed, more specifically a stoichiometric air-fuel ratio or a lean air-fuel ratio close thereto.

A load which is a boundary between the operation region where the spark ignition combustion is performed and an operation region where the compressed self-ignition is performed is set on the lower load side as the engine revolution speed increases.

Figure 3:
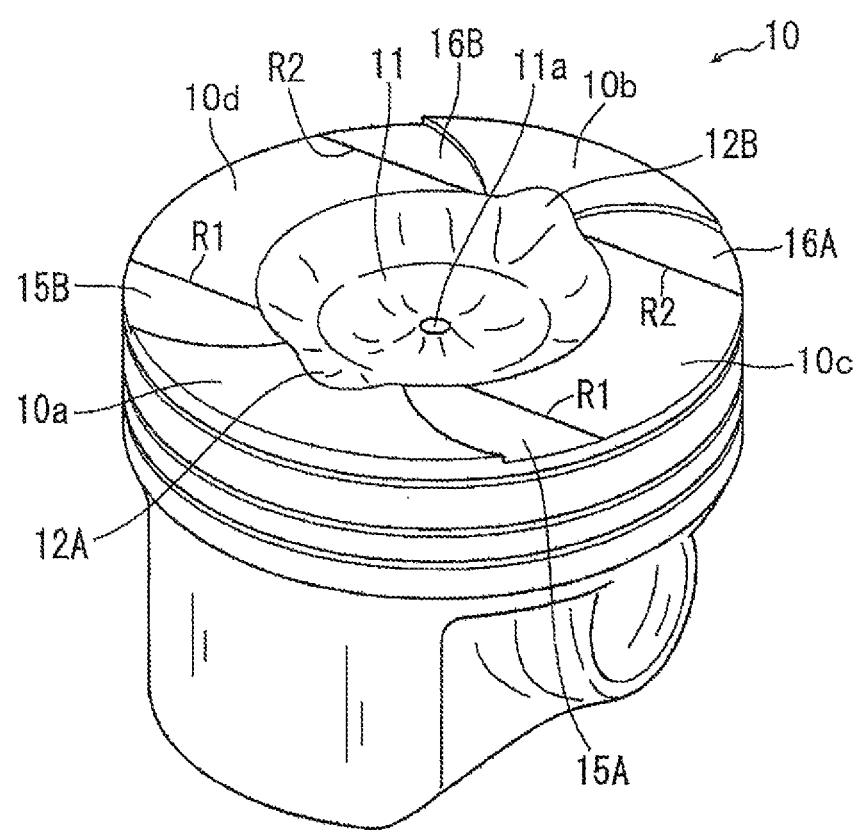
FIG. 3 is a perspective view illustrating a specific shape of the piston for use in the first embodiment.
Figure 4:
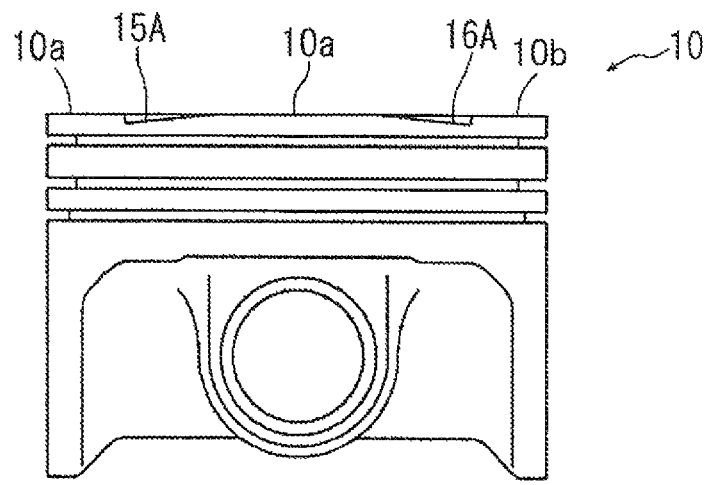
FIG. 4 is a side view of the piston shown in FIG. 3 that is taken from one side in the crankshaft direction.
Figure 5:
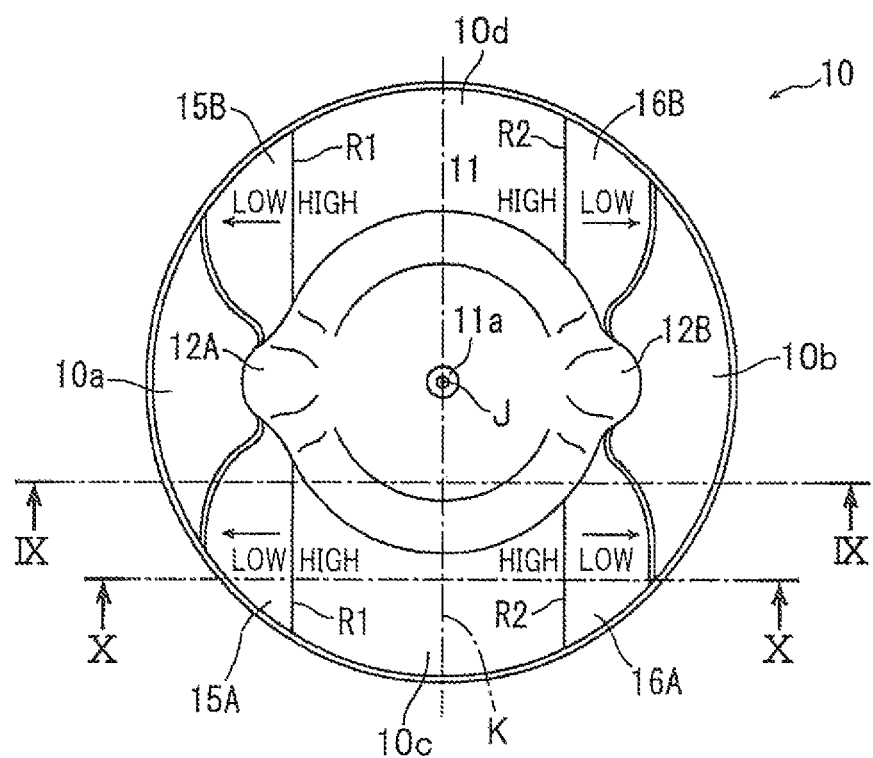
FIG. 5 is a plan view of the piston shown in FIG. 3 that is taken from above.

FIGS. 3 to 5 show the shape of the piston 10. As shown in the figures, a cavity 11 concaved downward (to the side opposite than of the cylinder head 30) is formed in the central portion of the crown surface (upper surface) of the piston 10. The cavity 11 is substantially round when viewed in the cylinder axis direction, and a peak-shaped protrusion portion 11a is formed in the central portion of the cavity 11.

Flat surfaces 10a, 10b, 10c, 10d extending along the plane orthogonal to the cylinder axis J, and valve recesses 15A, 15B, 16A, 16B and depressions 12A, 12B, which are shallower than the cavity 11, are formed in a portion of the crown surface of the piston 10 outside the cavity 11.

More specifically, in the present embodiment, the valve recesses 15A, 15B are formed in the crown surface of the piston 10 in portions facing the valve heads 1a of the intake valves 1A, 1B, and the valve recesses 16A, 16B are formed in the crown surface of the piston 10 in portions facing the valve heads 2a of the exhaust valves 2A, 2B. Further, the depressions 12A, 12B are formed to be connected to the cavity 11 in the crown surface of the piston 10 in the portions facing the first and second sparkplugs 4A, 4B. In the explanation below, where the four valve recesses 15A, 15B, 16A, 16B are to be distinguished from each other, the valve recess 15A for the intake valve 1A is referred to as "first valve recess", the valve recess 15B for the intake valve 1B is referred to as "second valve recess", the valve recess 16A for the exhaust valve 2A is referred to as "third valve recess", and the valve recess 16B for the exhaust valve 2B is referred to as "fourth valve recess".

Portions of the crown surface of the piston 10 outside the cavity 11, valve recesses 15A, 15B, 16A, 16B, and depressions 12A, 12B are all assumed to be flat surfaces (10a to 10d). In the present embodiment, the flat surface positioned between the first valve recess 15A for the intake valve 1A and the second valve recess 15B for the intake valve 1B is denoted by 10a, the flat surface positioned between the third valve recess 16A for the exhaust valve 2A and the fourth valve recess 16B for the exhaust valve 2B is denoted by 10b, the flat surface positioned between the first valve recess 15A for the intake valve 1A and the third valve recess 16A for the exhaust valve 2A is denoted by 10c, and the flat surface positioned between the second valve recess 15B for the intake valve 1B and the fourth valve recess 16B for the exhaust valve 2B is denoted by 10d. The height of those flat surfaces 10a, 10b, 10c, 10d is set to be the same, and the flat surfaces are set to be higher than the bottom surface of the cavity 11, the bottom surfaces of the valve recesses 15A, 15B, 16A, 16B, and the bottom surfaces of the depressions 12A, 12B.

Figure 6:
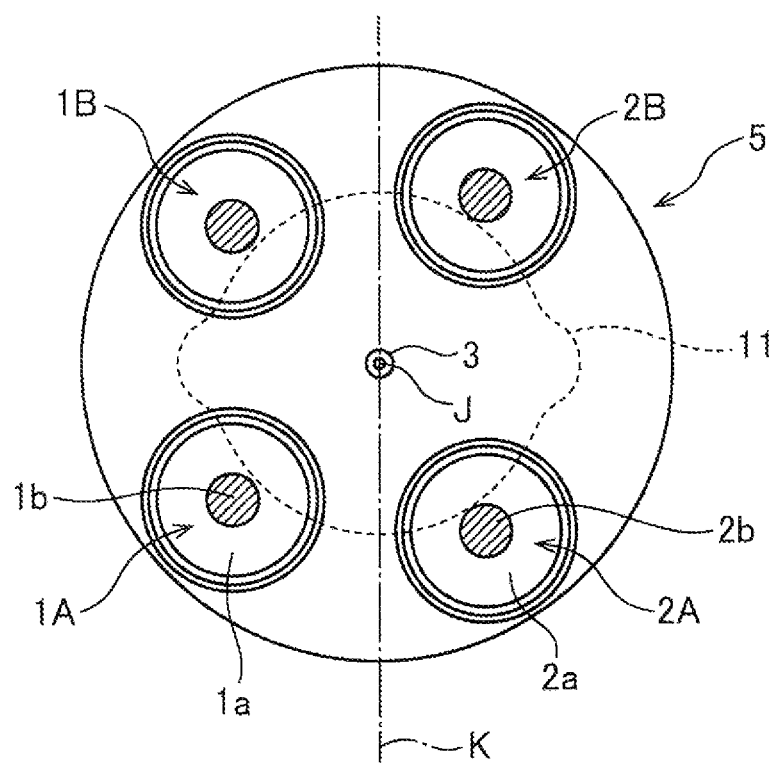
FIG. 6 is a schematic plan view illustrating the mutual arrangement of the intake and exhaust valves and the cavity.

As shown in FIG. 6, the intake valves 1A, 1B and the exhaust valves 2A, 2B are provided such that parts of the valve heads 1a, 2a overlap the cavity 11 of the piston 10 in the view taken in the cylinder axis direction.

Figure 7:
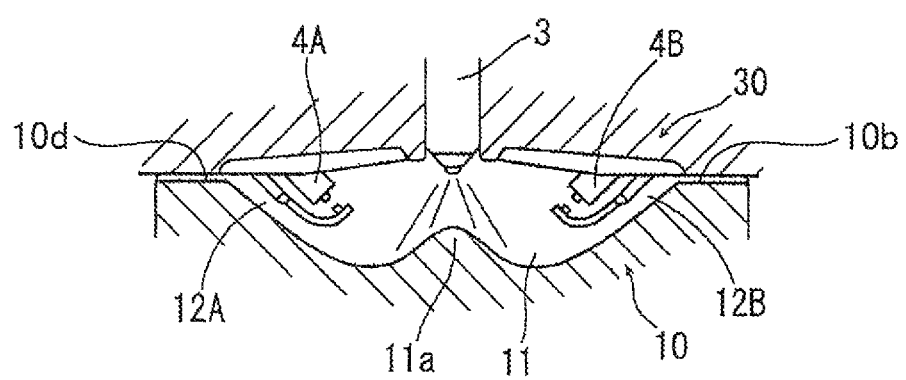
FIG. 7 is a cross-sectional view taken along the VII-VII line in FIG. 2.
Figure 8:
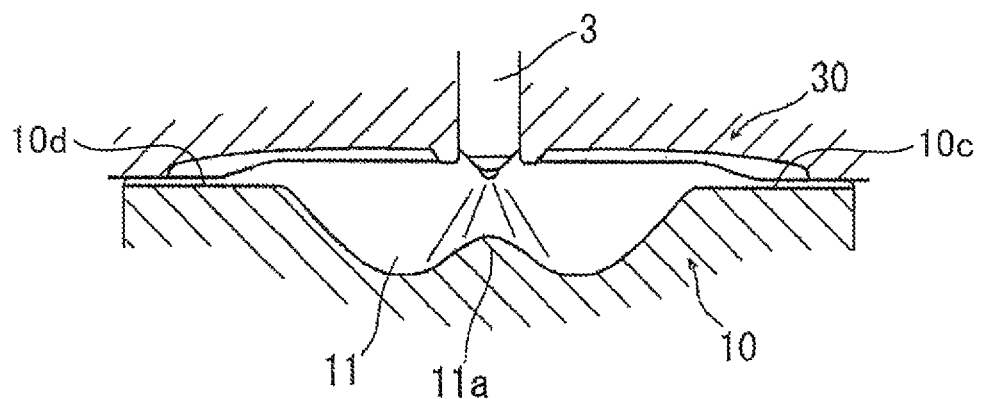
FIG. 8 is a cross-sectional view taken along the VIII-VIII line in FIG. 2.
Figure 9:
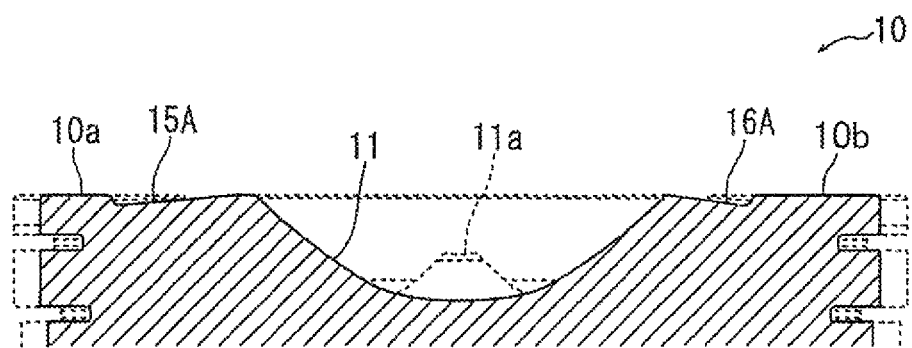
FIG. 9 is a cross-sectional view taken along the IX-IX line in FIG. 5.
Figure 10:
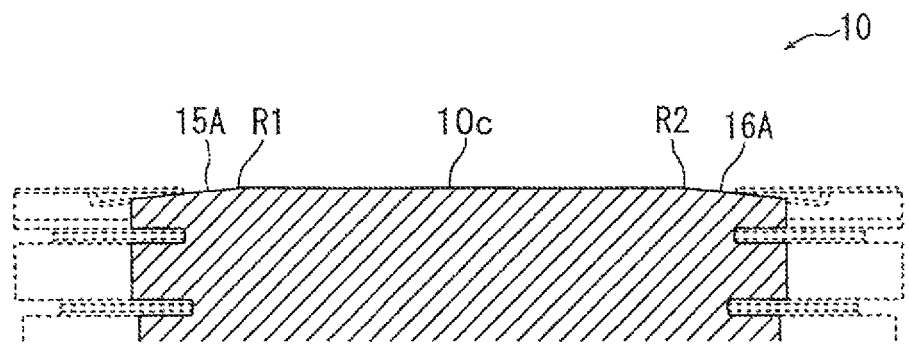
FIG. 10 is a cross-sectional view taken along the X-X line in FIG. 5.

As shown in FIGS. 7 and 8, the fuel injection valve 3 is provided such as to be positioned directly above the protruding portion 11a of the cavity 11. Further, as shown in FIG. 7, the first sparkplug 4A is provided such that the tip (electrode portion) thereof is accommodated inside the depression 12A, and the second sparkplug 4B is provided such that the tip (electrode portion) thereof is accommodated inside the depression 12B.

As shown in FIGS. 7 and 8, the portions of the lower surface of the cylinder head 30 that face the flat surfaces 10a, 10b, 10c, 10d of the piston 10 are flat surfaces extending along the plane orthogonal to the cylinder axis J. As a result, a uniformly small gap is formed between the cylinder head 30 and the flat surfaces 10a to 10d of the piston in the top dead center. Therefore, the increase in the geometric compression ratio (transition to a high compression ratio) and the formation of a squish flow (flow from the circumferential edge to the center of the combustion chamber) are promoted. Further, since the combustion chamber gap above the flat surfaces 10a to 10d is small, as mentioned hereinabove, the volume of the combustion chamber when the piston 10 is in the top dead center is mostly taken by the cavity 11.

Figure 11:
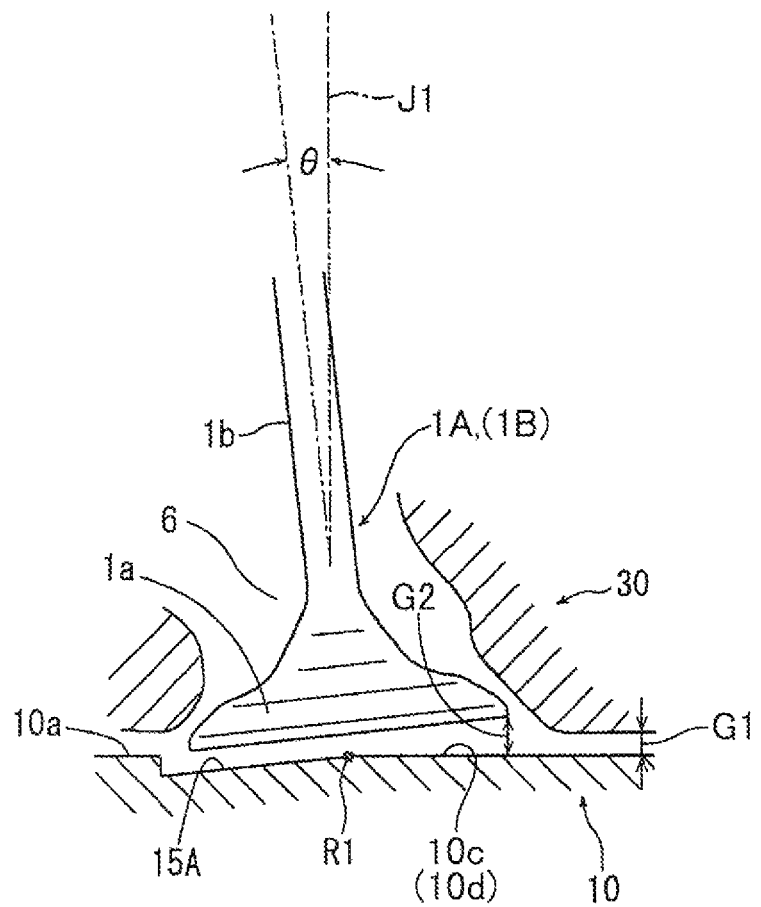
FIG. 11 is a cross-sectional view taken along the XI-XI line in FIG. 2.

In FIGS. 3, 5, and 11, the reference symbol R1 indicates the boundary position between the first, second valve recesses 15A, 15B for the intake valves 1A, 1B and the flat surfaces 10c, 10d adjacent thereto. The boundary position R1 is set to extend parallel to the crankshaft axis K at positions corresponding to the centers of the valve head 1a of the intake valves 1A, 1B (substantially matching the centers of the valve heads 1a in the view taken in the cylinder axis direction). The first and second valve recesses 15A, 15B are formed in the crown surface of the piston 10 in the portions corresponding to the valve heads 1a of the intake valves 1A, 1B in the regions on the side of the boundary position R1 that is farther from the crankshaft axis K. In particular, as shown in FIG. 11, the bottom surfaces of the first and second valve recesses 15A, 15B are inclined surfaces that are inclined such that the height decreases gradually with increasing distance from the crankshaft axis K.

The crown surface of the piston 10 on the side of the boundary position R1 that is closer to the crankshaft axis K is taken as the above-described flat surfaces 10c, 10d. In other words, the first and second valve recesses 15A, 15B are connected in a stepless manner to the flat surfaces 10c, 10d of the piston 10 at the boundary position R1.

The same configuration is used for the third and fourth valve recesses 16A, 16B for the exhaust valves 2A, 2B. Thus, where a boundary position R2 is assumed that corresponds to the centers of the valve heads 2a of the exhaust valves 2A, 2B and is parallel to the crankshaft axis K, the third and fourth valve recesses 16A, 16B are formed in the crown surface of the piston 10 in the portions facing the valve heads 2a of the exhaust valves 2A, 2B in the regions on the side of the boundary position R2 that is farther from the crankshaft axis K. The bottom surfaces of the third and fourth valve recesses 16A, 16B are inclined surfaces that are inclined such that the height decreases gradually with increasing distance from the crankshaft axis K.

The crown surface of the piston 10 on the side of the boundary position R2 that is closer to the crankshaft axis K is the above-described flat surfaces 10c, 10d. In other words, the third and fourth valve recesses 16A, 16B are connected in a stepless manner to the flat surfaces 10c, 10d of the piston 10 at the boundary position R2.

As described hereinabove, in the present embodiment, flat surfaces 10c, 10d of a comparatively large surface area that extend along a plane orthogonal to the crankshaft axis K are formed on the crown surface of the piston 10 positioned between the boundary positions R1 and R2. Where such flat surfaces 10c, 10d of a large surface area are formed in the circumferential edge portion of the piston 10, those flat surfaces 10c, 10d approach the cylinder head 30 when the piston 10 rises, thereby making it possible to obtain good squish flow in a wide range. Further, since the flow of intake air flowing in the circumferential direction on the flat surfaces 10c, 10d is unlikely to occur, the flow of intake air from the intake valve 1A side toward the exhaust valve 2A side is inhibited and the flow of intake air from the intake valve 1B side toward the exhaust valve 2B side is also inhibited.

The relationship between the intake valve 1A and the first valve recess 15A is explained below with reference to FIG. 11. The valve stem 1b of the intake valve 1A is arranged along a plane orthogonal to the crankshaft axis K, but also arranged to as to be inclined at a predetermined angle θ (here, 5 degrees) with respect to the cylinder axis J. More specifically, as viewed in crankshaft direction, the central axis of the valve stem 1b is inclined such as to recede gradually from the cylinder axis J in the course of receding from the valve head 1a of the intake valve 1A (in the upward direction). In FIG. 11, a virtual axial line parallel to the cylinder axis J is represented by a reference symbol J1, and the angle formed by the virtual axial line J1 and the central line of the valve stem 1b is represented by the θ.

The inclination angle of the bottom surface of the first valve recess 15A is also made to correspond to the inclination angle θ of the valve stem 1b. In other words, the lower surface of the valve head 1a of the intake valve 1A and the bottom surface of the first valve recess 15A are made parallel to each other. However, since the boundary position R1 of the first valve recess 15A is positioned substantially in the center of the valve head 1a, on the side of the boundary position R1 that is closer to the crankshaft axis K, the gap between the lower surface of the valve head 1a and the flat surface 10c of the piston 10 is set to expand gradually as the crankshaft axis K is approached. In other words, when the intake air supplied into the combustion chamber from the circumferential edge of the valve head 1a on the left end in FIG. 11 (in FIG. 2, in particular, the circumferential edge in the below-described third quadrant A of the valve head 1a) passes through the lower surface of the valve head 1a, the intake air can smoothly pass through the gap that has been gradually expanded by the above-described setting of the inclination angle θ. In particular, in the present embodiment, as shown in FIG. 5, since part of the first valve recess 15A (a portion close to the adjacent second valve recess 15B) is connected to the cavity 11, the intake air smoothly flowing through at the lower surface of the valve head 1a is easily introduced into the cavity 11.

Further, in the present embodiment, the flat surface 10c of a comparatively large surface area is formed between the first valve recess 15A and the third valve recess 16A, and this also promotes the above-mentioned introduction of the intake air into the cavity 11. More specifically, in the present embodiment, the minimum gap between the lower surface of the cylinder head 30, which is positioned between the intake valve 1A and the exhaust valve 2A that faces the intake valve 1A, with the crankshaft axis K being interposed therebetween, and the flat surface 10c of the piston 10 that faces this lower surface is taken as a value G1 shown in FIG. 11 at a center timing Tc of the overlap period. Where the maximum value of the gap between the flat surface 10c and the lower surface of the valve head 1a of the intake valve 1A at the center timing Tc of the same overlap period, that is, a gap between the flat surface 10c and the circumferential edge (right end portion in FIG. 11) on the side of the valve head 1a that is the closest to the crankshaft axis K, is taken as G2, then the relationship between the maximum gap G2 and the minimum gap G1 is set as G2>G1. As a result, the flow of intake air flowing from the intake valve 1A side toward the exhaust valve 2A side is inhibited. Therefore, the aforementioned introduction of the intake air into the cavity 11 is further promoted.

In this case, the valve head 1a of the intake valve 1A, as viewed in the cylinder axis direction, is virtually divided into four regions (quadrants). More specifically, as shown in FIG. 2, the direction passing through the center of the valve head 1a of the intake valve 1A and orthogonally to the crankshaft axis K is taken as an X axis, and the direction that passes through the center of the valve head 1a of the intake valve 1A and extends parallel to the crankshaft axis K is taken as an Y axis. Of the four regions obtained by dividing the valve head 1a with the X axis and Y axis, the region which is the farthest from the cylinder axis J is taken as a third quadrant A. The region adjacent to the third quadrant A in the X axis direction is taken as a fourth quadrant B, the region adjacent to the third quadrant A in the Y axis direction is taken as the second quadrant C, and the region adjacent to the second quadrant C in the X axis direction is taken as the first quadrant D.

The intake air supplied into the combustion chamber from the circumferential edge of the third quadrant A and the fourth quadrant B of the valve head 1a flows mainly toward the cavity 11 due to the above-described setup (expansion of the gap G2 by setting of the inclination angle θ), and a flow shown by an arrow α in FIG. 2 is formed. Meanwhile, in FIG. 2, the flow of intake air flowing from the third and fourth quadrants A, B toward the exhaust valve 2A side is shown by an arrow β. However, since, the intake air flow shown by the arrow β is blocked by the above-described setup (reduction of the gap G1), the flow in the direction of arrow α is intensified accordingly. As a result of such an intensification of the flow of the intake air flowing in the direction of arrow α, the introduction of the intake air into the cavity 11 is promoted and the interior of the cavity 11 is sufficiently scavenged.

Further, in the present embodiment, the following configuration is used with respect to the intake valve 1A in order to intensify further the flow in the direction of arrow α.

Figure 13:
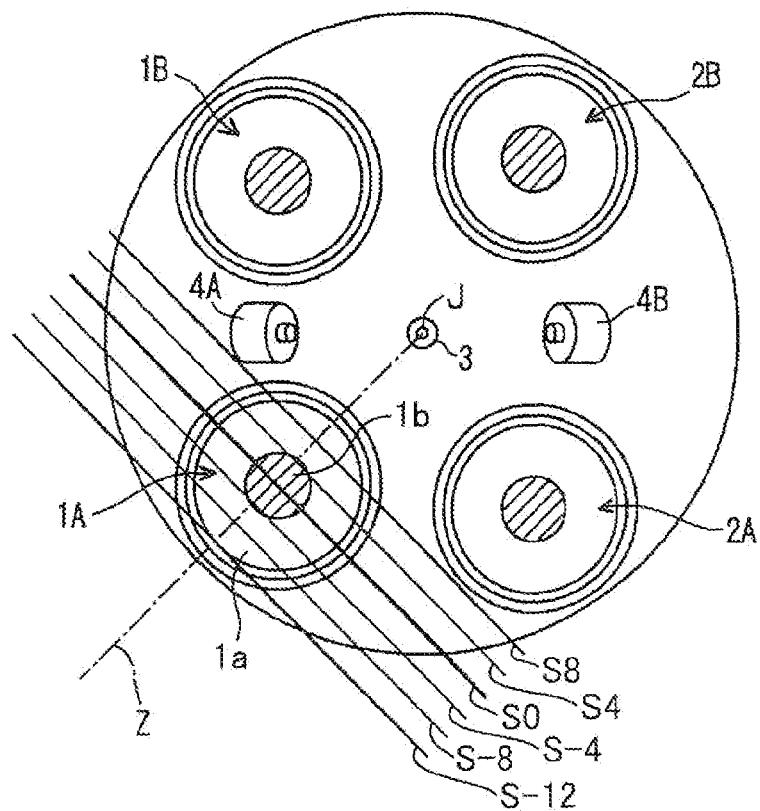
FIG. 13 is a plan view showing the position (cutting position) of a virtual cut surface for specifying the curtain surface area of the intake valve and the gap surface area under the valve head of the intake valve.

First, as shown in FIG. 13, as viewed in the cylinder axis direction, a virtual line Z is assumed that connects the cylinder axis J with the center of the valve head 1a of the intake valve 1A. Then, it is assumed that the valve head 1a is cut by arbitrary cross sections which are orthogonal to the virtual line Z and parallel to the axial line (central axis of the valve stem 1b) of the intake valve 1A. The cross-sectional positions in this case are denoted by Si. The "i" in the cross-sectional position Si represents the distance (mm) from the center (valve center) of the valve head 1a to the cylinder axis J side on the virtual line Z. Therefore, the "i" is 0 when the cross-sectional position passes through the valve center, has a negative numerical value when the cross-sectional position shifts radially outward (cylinder liner side) of the cylinder 5 from the valve center, and has a positive numerical value when the cross-sectional position shifts radially inward (cylinder axis J side) of the cylinder 5 from the valve center. FIG. 13 shows S-12, S-8, S-4, S0, S4, S8, as an example of the cross-sectional positions following this rule. For example, S-12 is a cross-sectional position at a distance of −12 mm radially outward of the valve center, S0 is a cross-sectional position passing through the valve center, and S8 is a cross-sectional position at a distance of 8 mm radially inward of the valve center.

Figure 14:
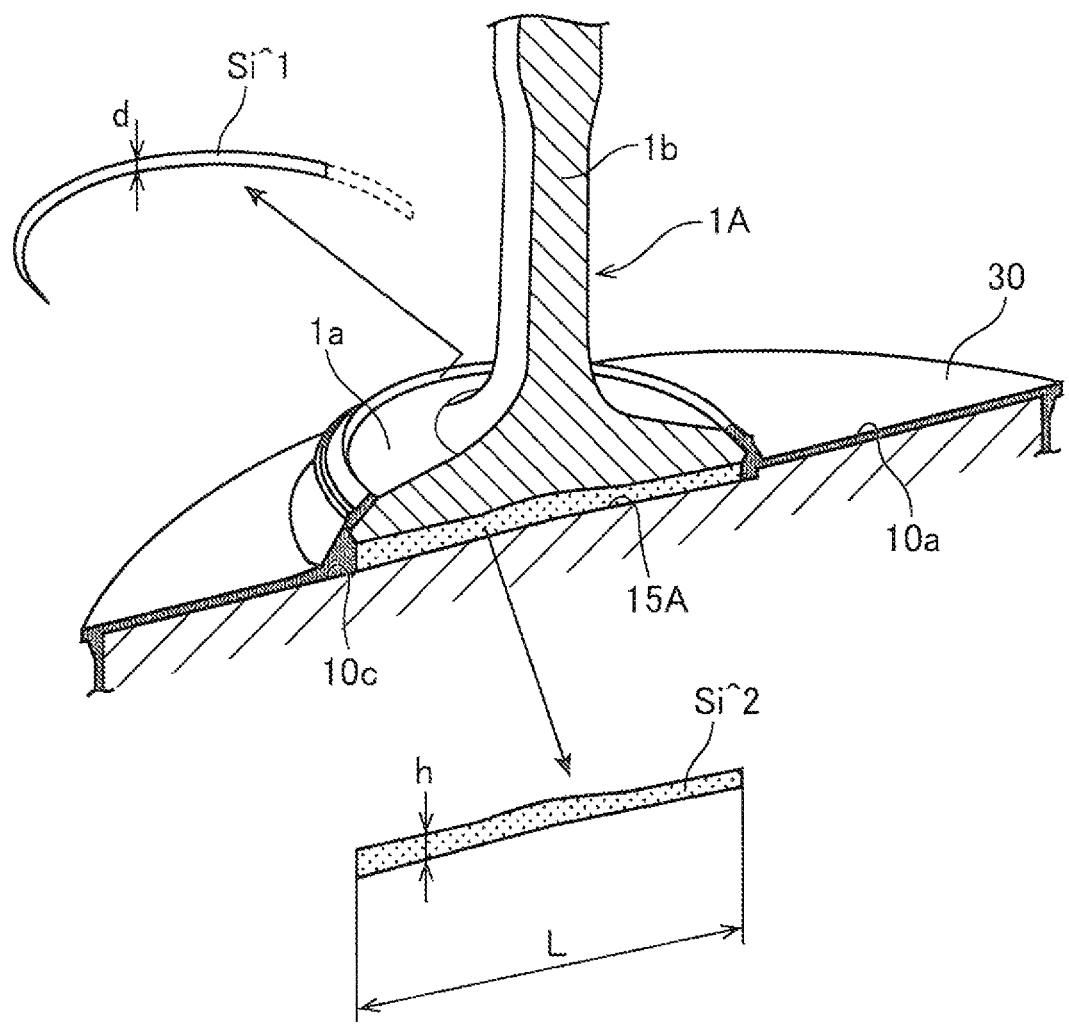
FIG. 14 is a cross-sectional perspective view showing the curtain surface area and the gap surface area under the valve head at the same time.

Further, in the present embodiment, a curtain surface area Si^1 of the valve head 1a and a gap surface area Si^2 under the valve head 1a, such as shown in FIG. 14, are specified as characteristic values of the intake valve 1A at the arbitrary cross-sectional positions Si. For example, the curtain surface area at the cross-sectional position S-12 is S-12^1, the curtain surface area at the cross-sectional position S0 is S0^1, and the curtain surface area at the cross-sectional position S8 is S8^1. Further, the gap surface area under the valve head 1a at the cross-sectional position S-12 is S-12^2, the gap surface area under the valve head 1a at the cross-sectional position S0 is S0^2, and the gap surface area under the valve head 1a at the cross-sectional position S8 is S8^2.

As shown in FIGS. 14 and 16 to 21, the "curtain surface area Si^1 at the cross-sectional position Si", as referred to herein, is the area defined by the shortest distance d (FIG. 14) between the valve seat surface and the valve head 1a that will seat thereon at the center timing Tc of the valve overlap period, and the length W (FIGS. 16 to 21) in the circumferential direction that is determined in relation to the cross-sectional position Si, more specifically, a value obtained by integrating the shortest distance d over the range of the length W in the circumferential direction. The length W in the circumferential direction, as referred to herein, corresponds to the length of the circumferential edge of the overlapping portion of the region on the side of the cross-sectional position Si that is farther from the cylinder axis J and the third quadrant A and fourth quadrant B of the valve head 1a. In FIGS. 16 to 21, the curtain surface area Si^1 is shown as a circular-arc white region.

Meanwhile, as shown in FIG. 14, the "gap surface area Si^2 under the valve head 1a at the cross-sectional position Si", as referred to herein, is a surface area defined by the length L of the bottom side of the cross-sectional surface of the valve head 1a in the case where the valve head 1a is cut at the cross-sectional position Si at the center timing Tc of the overlap period, and the distance h from this bottom side to the crown surface of the piston 10 facing the same, more specifically, a value obtained by integrating the distance h over the range of the length L of the bottom side.

Figure 15:
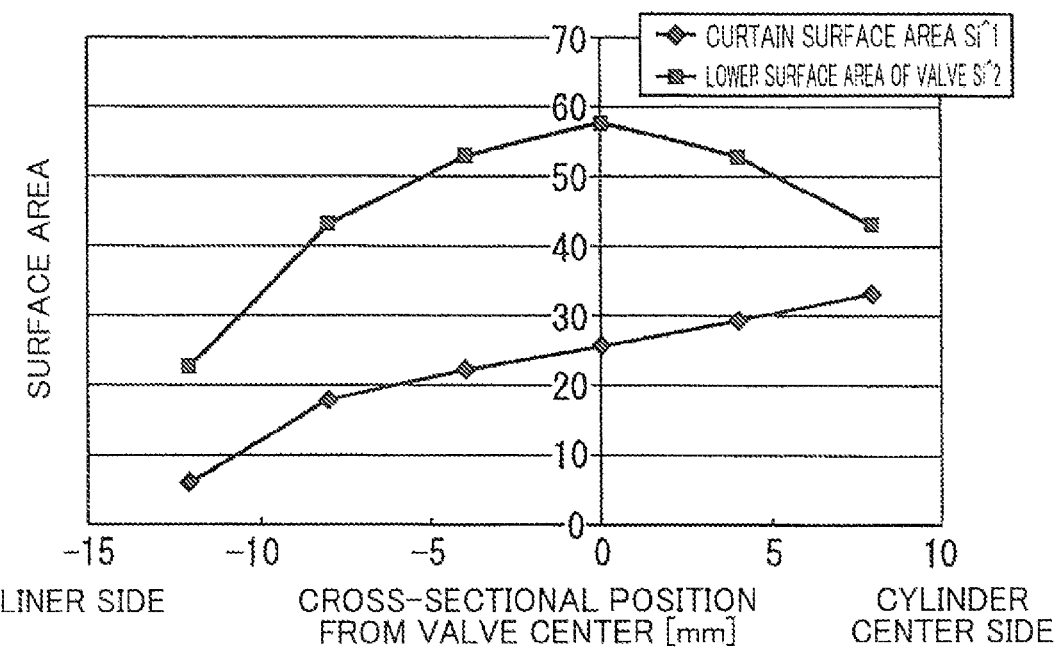
FIG. 15 is a characteristic diagram illustrating a specific setting example of the curtain surface area and the gap surface area under the valve head.
Figure 16:
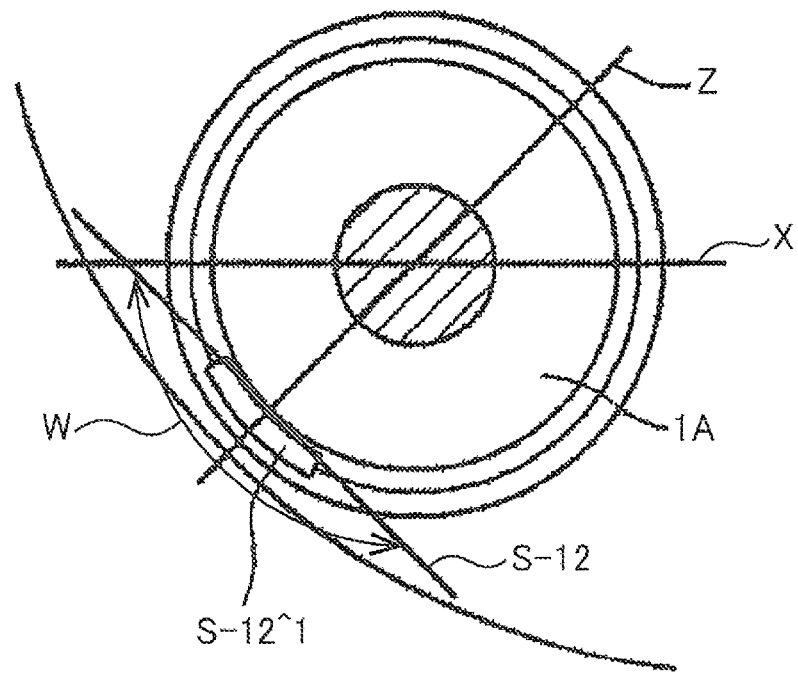
FIG. 16 is a principal plan view showing the range of the curtain surface area at the cross-sectional position S-12.
Figure 17:
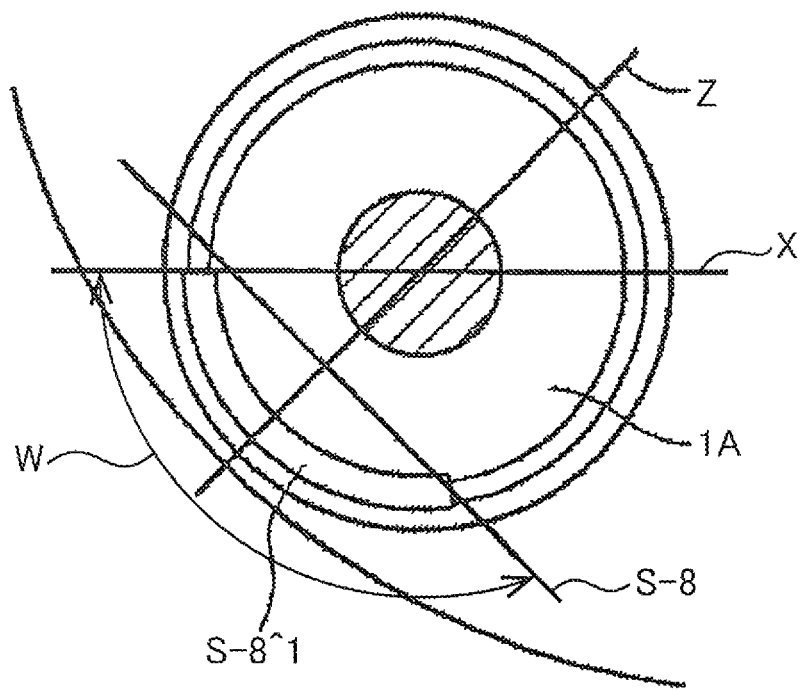
FIG. 17 is a principal plan view showing the range of the curtain surface area at the cross-sectional position S-8.
Figure 18:
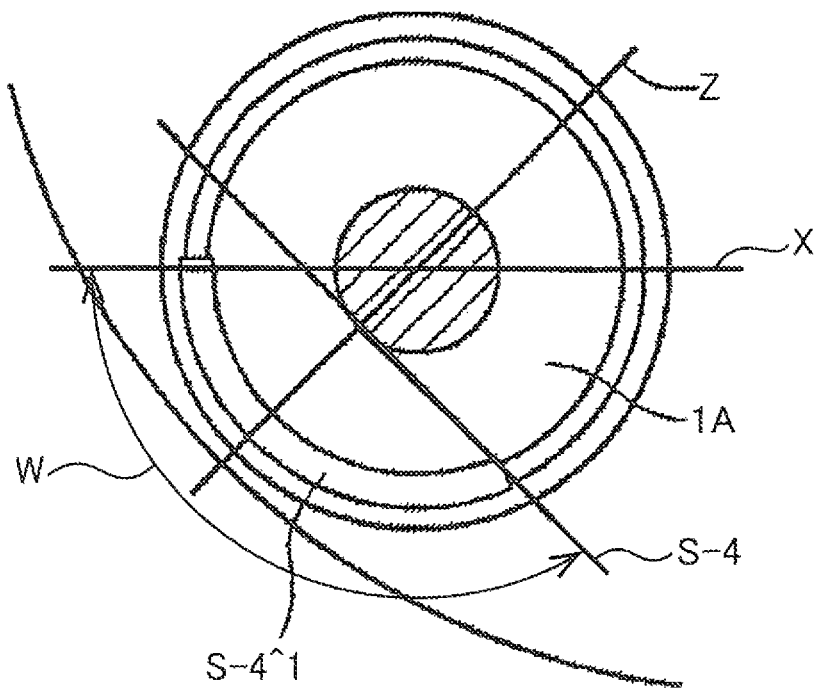
FIG. 18 is a principal plan view showing the range of the curtain surface area at the cross-sectional position S-4.
Figure 19:
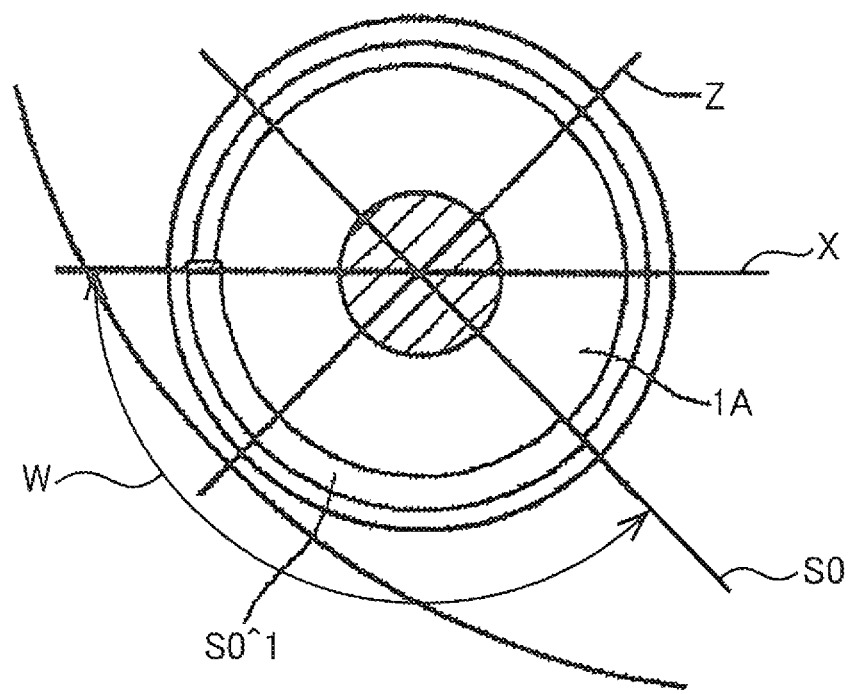
FIG. 19 is a principal plan view showing the range of the curtain surface area at the cross-sectional position S0.
Figure 20:
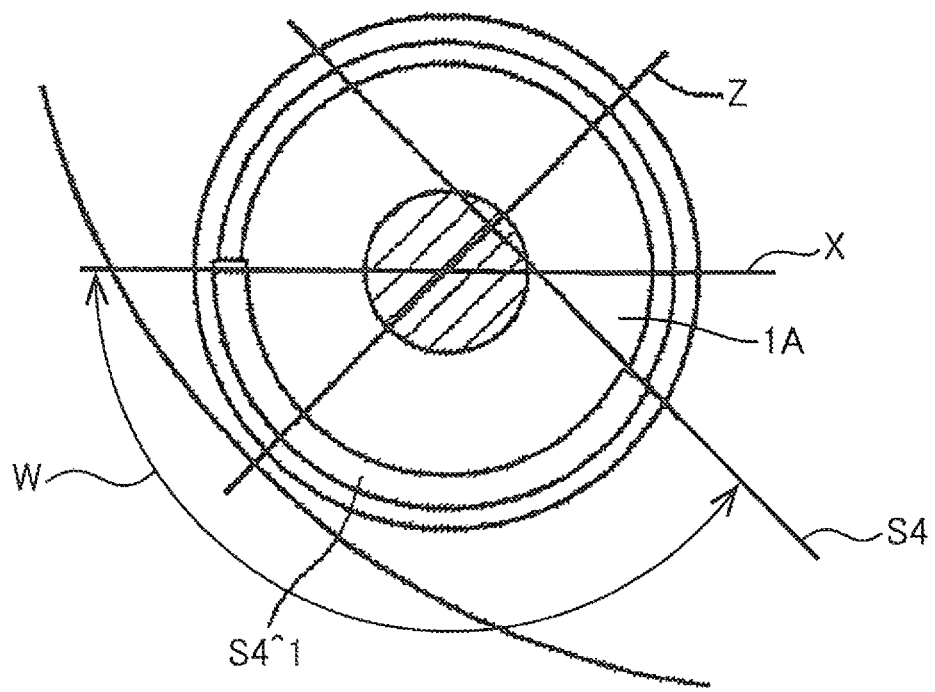
FIG. 20 is a principal plan view showing the range of the curtain surface area at the cross-sectional position S4.
Figure 21:
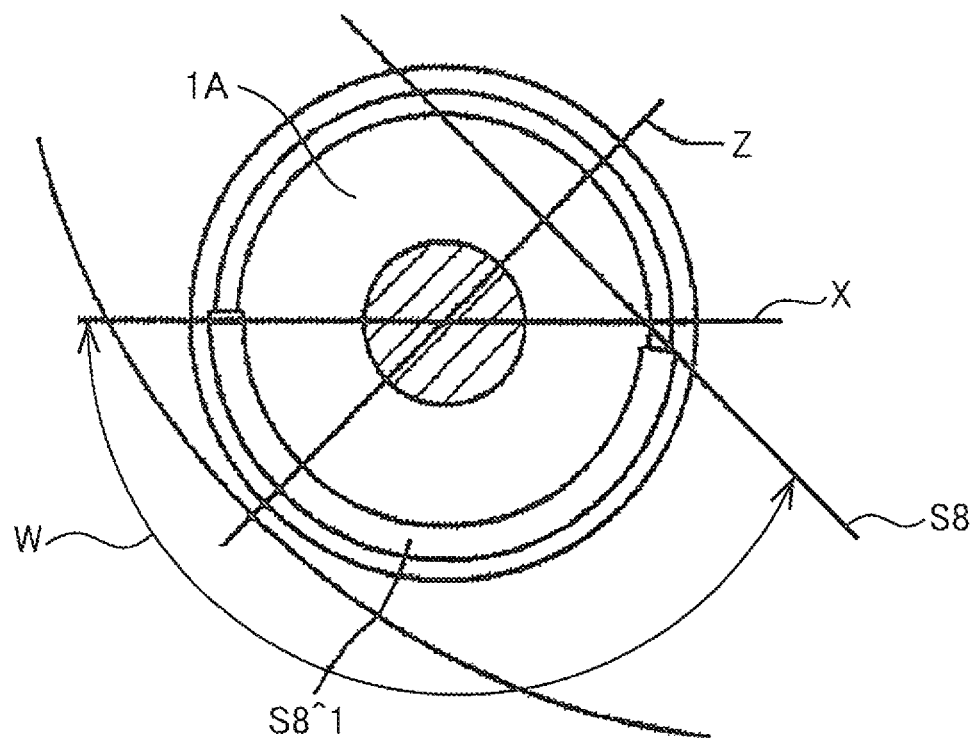
FIG. 21 is a principal plan view showing the range of the curtain surface area at the cross-sectional position S8.
Figure 22:
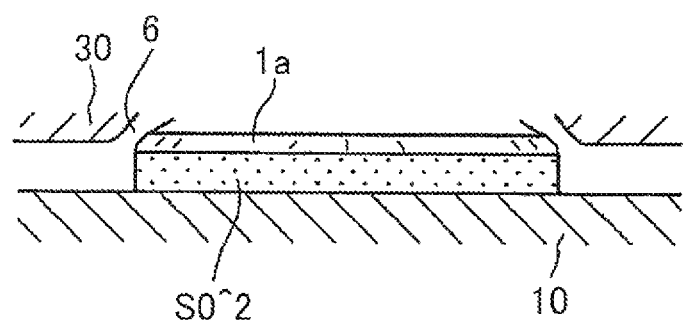
FIG. 22 is a principal plan view showing the gap surface area under the valve head at the cross-sectional position S0.
Figure 23:
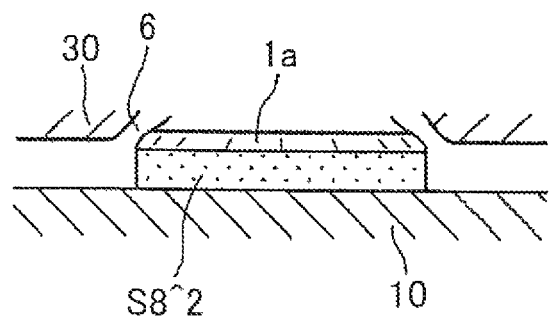
FIG. 23 is a principal plan view showing the gap surface area under the valve head at the cross-sectional position S8.

FIG. 15 is a graph illustrating an example of specific numerical values of the curtain surface area Si^1 and the gap surface area Si^2 under the valve head 1a. As shown in the figure, in the present embodiment, in any of the cross-sectional positions S-12 to S8, the gap surface area Si^2 under the valve head 1a is larger than the curtain surface area Si^1, in other words, the relationship Si^2≥Si^1 is fulfilled at all of the cross-sectional positions Si.

The curtain surface area Si^1 is specified by paying attention only to the third quadrant A and fourth quadrant B of the valve head 1a, as in the present embodiment, for the following reason. Practically the entire intake air supplied into the combustion chamber from regions other than the third and fourth quadrants A, B of the valve head 1a, in other words, from the circumferential edge of the first quadrant D or second quadrant C of the valve head 1a, apparently passes through the combustion chamber gap outside the first and second quadrants C, D and is introduced comparatively smoothly into the cavity 11, without flowing under the valve head 1a. By contrast, the intake air supplied into the combustion chamber from the circumferential edge of the third and fourth quadrants A, B of the valve head 1a cannot enter the cavity 11 smoothly, unless it passes under the valve head 1a. Therefore, the relationship Si^2≥Si^1 is fulfilled in order to facilitate the introduction of the intake air from the third and fourth quadrants A, B under the valve head 1a.

Explained hereinabove are the relationship between the intake valve 1A and the first valve recess 15A, and the relationship between the curtain surface area Si^1 of the intake valve 1A and the intake surface area Si^2 under the valve head 1a, but such features relating to the intake valve 1A are likewise used in the other intake valve 1B.

Thus, the axial line of the intake valve 1B is inclined at a predetermined angle θ (in this case, 5 degrees) with respect to the cylinder axis J. On the side of the boundary position R1 of the valve recess 15B corresponding to the intake valve 1B that is closer to the crankshaft axis K, the gap between the lower surface of the valve head 1a and the flat surface 10d of the piston 10 is set to expand gradually as the crankshaft axis K is approached. Further, the maximum value (corresponds to G2 in FIG. 11) of this gap is larger than the maximum gap (corresponds to G1 in FIG. 11) above the flat surface 10d. Furthermore, the gap surface area (corresponds to the Si^2 in FIG. 14) under the valve head 1a of the intake valve 1B at an arbitrary cross-sectional position parallel to the axial line of the intake valve 1B and orthogonal to a virtual line connecting the center of the valve head 1a of the intake valve 1B and the cylinder axis J is set to a value which is equal to or greater than the curtain surface area (corresponds to Si^1 in FIG. 14).

Further, the features relating to the intake valves 1A, 1B are likewise used in the exhaust valves 2A, 2B.

Figure 24:
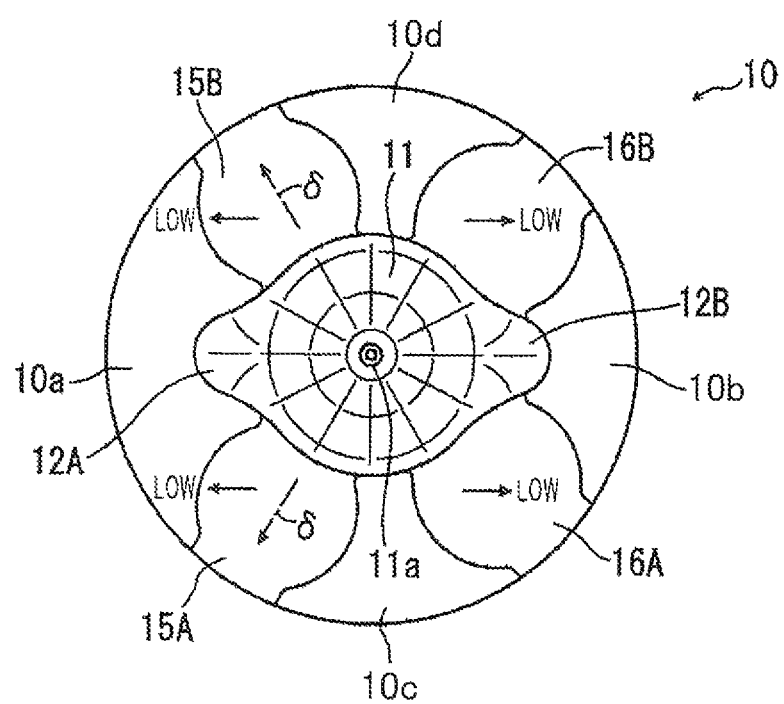
FIG. 24 is a plan view corresponding to FIG. 5 and showing a piston for use in the second embodiment.
Figure 25:
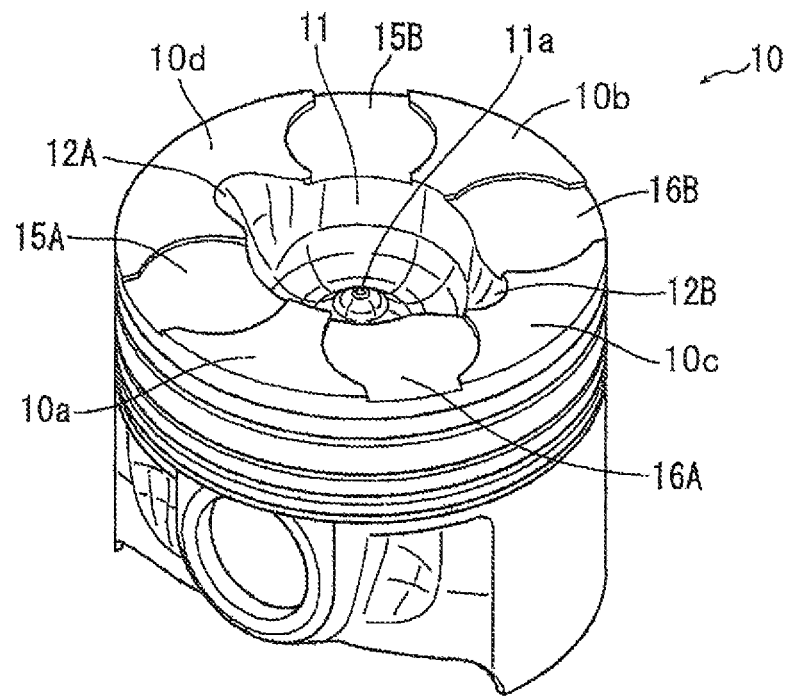
FIG. 25 is a perspective view corresponding to FIG. 3 and showing a piston for use in the second embodiment.
Figure 26:
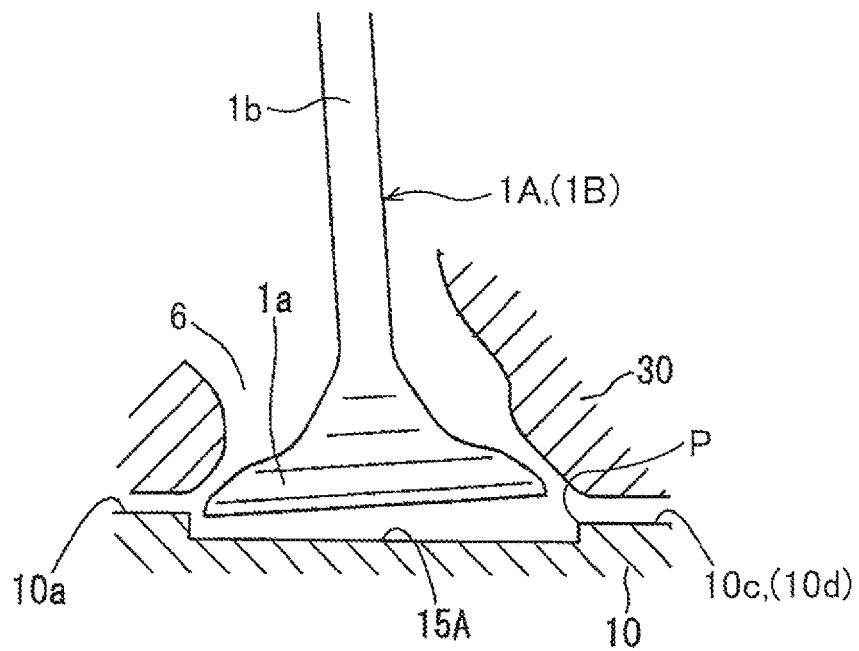
FIG. 26 is a cross-sectional view corresponding to FIG. 11 and illustrating the second embodiment.

FIGS. 24 to 26 illustrate the second embodiment of the present invention. Here, constituent elements same as those of the above-described embodiment are assigned with same reference numerals and the redundant explanation thereof is herein omitted.

In the second embodiment, the valve recesses 15A, 15B, 16A, 16B are all formed such as to be capable of accommodating almost all portions of the valve heads 1a, 2a of the intake and exhaust valves, more specifically, the portions other than the portions of the valve heads 1a, 2a that overlap the cavity 11. More specifically, the bottom surfaces of the valve recesses 15A, 15B, 16A, 16B are all formed to be flat, and the height thereof is made as a whole slightly less (for example, by 1 mm) than that of the flat surfaces 10a to 10d on the crown surface of the piston 10.

FIG. 26 shows the cross-sectional shape of the intake valve 1A and the first valve recess 15A corresponding thereto. As follows from FIG. 26, the valve head 1a of the intake valve 1A is formed such as to cover entirely the first valve recess 15A, and a gap between the lower surface of the valve head 1a and the first valve recess 15A gradually increases over the entire surface as the crankshaft axis K is approached. A step P is formed between the first valve recess 15A and the flat surface 10c positioned on the exhaust valve 2A side therefrom. The relationship between the other intake valve 1B and the valve recess 15B, and the relationship between the exhaust valves 2A, 2B and the valve recesses 16A, 16B are set in the same manner.

With such a configuration, the flow of the intake air that passes above the flat surface 10c (10d) and flows toward the exhaust valves 2A, 2B is blocked by the step P. Therefore, the introduction of the intake air into the cavity 11 is promoted. Further, the formation of the valve recess 15A (15B, 16A, 16B) is facilitated.

Figure 27:
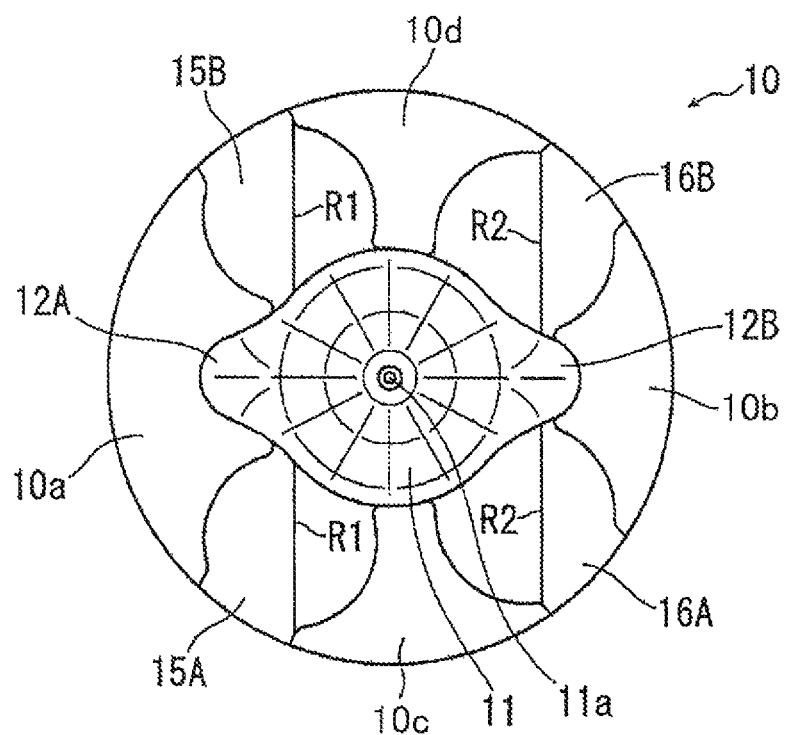
FIG. 27 is a plan view corresponding to FIG. 5 and showing a piston for use in the third embodiment.
Figure 28:
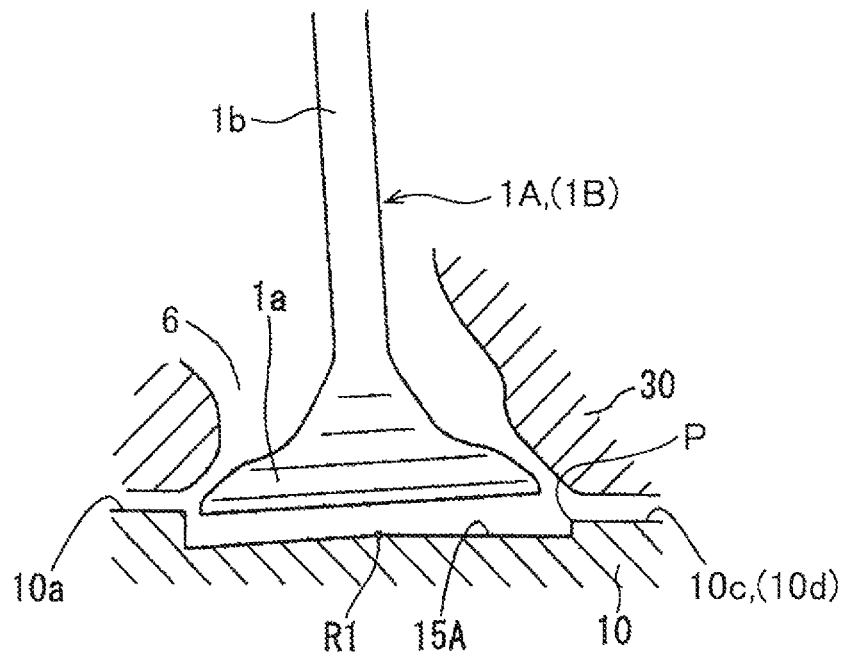
FIG. 28 is a cross-sectional view corresponding to FIG. 11 and illustrating the third embodiment.

FIGS. 27 and 28 illustrate the third embodiment (variation example of the second embodiment) of the present invention. In the third embodiment, in the same manner as in the second embodiment shown in FIGS. 24 to 26, the height of the bottom surfaces of the valve recesses 15A, 15B, 16A, 16B is set less as a whole than that of the flat surfaces 10a, 10b, 10c, 10d of the piston 10. However, by contrast with the second embodiment, in the third embodiment, part of the bottom surfaces of the valve recesses 15A, 15B, 16A, 16B is inclined.

More specifically, the bottom surface of the valve recesses 15A (15B, 16A, 16B) is divided into a flat surface and an inclined surface, for which a boundary position R1' (R2', R3', R4') corresponding to the center of the valve head 1a serves as a boundary. For example, regarding the valve recess 15A, as shown in FIG. 28, the inclined surface with a height decreasing with increasing distance from the crankshaft axis K is formed in the region on the side of the boundary position R1' that is farther from the crankshaft axis K. By contrast, the region on the side of the boundary position R1' that is closer to the crankshaft axis K, the surface is flat. The step P is formed between the flat surface of the valve recess 15A and the flat surface 10c of the piston 10 positioned on the exhaust valve 2A side therefrom.

The preferred embodiments of the present invention are explained hereinabove, but the present invention is not limited to the above-described embodiments and can be changed, as appropriate, without departing from the scope of the claims.

For example, only the axial lines (central line of each valve stem 1b) of the intake valves 1A, 1B may be inclined with respect to the cylinder axis J, and the axial lines of the exhaust valves 2 may be set parallel to the cylinder axis J. As a result, a combustion chamber of a flatter shape can be obtained. Further, the axial lines of the intake valves 1A, 1B may be inclined in the direction (direction shown by arrow δ in FIG. 24) of a virtual line connecting the center of the valve head 1a of the intake valve 1 with the cylinder axis J, as viewed in the cylinder axis direction. In this case, the bottom surfaces of the valve recesses 15A, 15B are formed to decrease in height radially outward of the cylinder 5.

Further, in the embodiments, an example is explained in which the combustion chamber structure in accordance with the present invention is used in an inline multicylinder engine (the engine in which a plurality of cylinders 5 is arranged along the crankshaft axis K) to be installed on an automobile, but the combustion chamber structure in accordance with the present invention is not limited to automotive engines and can be also used in engines of other appropriate applications. The number of the cylinders in the engine and the arrangement system of the cylinders are not particularly limited. Therefore, the combustion chamber structure in accordance with the present invention can be also used in engines of other appropriate systems, for example, V-type multicylinder engines or single-cylinder engines.

Further, in the embodiments, an example is explained in which the combustion chamber structure in accordance with the present invention is used in an engine in which the compressed self-ignition is performed only in a low-load range, but the combustion chamber structure in accordance with the present invention can be advantageously used in an engine in which the compressed self-ignition can be performed also in the operation region other than the low-load range, for example, an engine in which the compressed self-ignition can be performed in the entire range in the load direction.

Summary of Embodiments

Specific features disclosed in the embodiments, and the operation effects based thereon, are summarized below.

The combustion chamber structure of the embodiments includes: a cylinder block having one or more cylinders; a cylinder head that covers the cylinder from one side in a cylinder axis direction; a piston reciprocatingly inserted into the cylinder; intake valves provided at a ratio of two valves per cylinder at one side thereof from among two regions separated by a crankshaft axis; and exhaust valves provided at a ratio of two valves per cylinder at the other side thereof from among the two regions separated by the crankshaft axis, and that is adopted to an engine in which compressed self-ignition is performed in at least a low-load range. The geometric compression ratio of the cylinder is set to 15 or higher, and a cavity is formed in a central portion of a crown surface of the piston. A part of a valve head of each intake valve overlaps the cavity, as viewed in the cylinder axis direction. Valve recesses for preventing interference between the piston and the valve heads of the intake valves are formed in the piston crown surface so as to be connected to the cavity. An axial line of the intake valve is inclined to recede from the cylinder axis with increasing distance from the valve head, as viewed in the cylinder axis direction, and a gap between the piston crown surface and a region which is a part of a lower surface of the valve head, at least on a side that is closer to the crankshaft axis, expands in accordance with approach of the crankshaft axis. A relationship of G2>G1 is fulfilled, where G1 stands for a minimum gap between a lower surface of the cylinder head that is positioned between the intake valve and the exhaust valve facing the intake valve, with the crankshaft axis being interposed therebetween, and the piston crown surface in a top dead center, and G2 stands for a gap at a position that is the closest to the crankshaft axis, from among the gaps between the lower surface of the valve head of the intake valve and the piston crown surface at a center timing of a valve overlap period in which the intake valve and the exhaust valve are both open.

With such a configuration, the intake air supplied into the combustion chamber from the circumferential edge of the region in the valve head of the intake valve on the side that is farther from the cylinder axis is introduced into the cavity through the zone under the valve head of the inclined intake valve. Therefore, the introduction of the intake air into the cavity can be promoted and the interior of the cavity can be sufficiently scavenged.

In the combustion chamber structure, it is preferred that the valve recess be a first valve recess and a second valve recess provided individually correspondingly to the two intake valves, and a flat surface with a height larger than that of bottom surfaces of the two valve recesses be provided in a circumferential edge portion of the piston crown surface positioned between the first and second valve recesses.

With such a configuration, scavenging of the cavity can be further promoted while ensuring sufficient increase in the geometric compression ratio (transition to higher compression ratio).

In the combustion chamber structure, in a case in which the valve head of the intake valve is assumed to be cut by arbitrary cross sections which are orthogonal to a virtual line connecting the cylinder axis and the center of the valve head of the intake valve and parallel to the axial line of the intake valve, where each cross-sectional position is denoted by Si, a curtain surface area of the intake valve at the cross-sectional position Si is denoted by Si^1, and a gap surface area under the valve head at the cross-sectional position Si is denoted by Si^2, it is preferred that a relationship of Si^2≥Si^1 be fulfilled. Here, the "curtain surface area Si^1 at the cross-sectional position Si", as referred to herein, is an area defined by a shortest distance between a valve seat surface and the valve head that is to seat thereon at the center timing of the valve overlap period, and a length in a circumferential direction of an overlapping portion of a region on a side of the cross-sectional position Si that is farther from the cylinder axis and a third quadrant and a fourth quadrant of the valve head; the "gap surface area Si^2 under the valve head at the cross-sectional position Si", as referred to herein, is a surface area defined by a length of a bottom side of a cross-sectional surface of the valve head in a case where the valve head is cut at the cross-sectional position Si at the center timing of the overlap period, and a distance from this bottom side to the piston crown surface facing the same; the "third quadrant of the valve head", as referred to herein, is a region positioned at a largest distance from the cylinder axis in a case in which the valve head is divided into four regions by an X axis passing through the center of the valve head of the intake valve and orthogonal to the crankshaft axis, and an Y axis passing through the center of the valve head of the intake valve and parallel to the crankshaft axis, as viewed from the cylinder axis direction; and the "fourth quadrant of the valve head", as referred to herein, is a region adjacent to the third quadrant in the X-axis direction.

With such a configuration, the intake air supplied from the circumferential edge of the valve head of the intake valve into the combustion chamber flows smoothly into the cavity, without receiving a large resistance when passing along the lower surface of the valve head. Therefore, the aforementioned scavenging of the cavity can be further promoted.

In the combustion chamber structure, it is preferred that almost the entire portion of the piston crown surface excluding the valve recesses and the cavity be a flat surface extending along a plane orthogonal to the cylinder axis, and a portion of the lower surface of the cylinder head that faces the flat surface of the piston crown surface be a flat surface extending along a plane orthogonal to the cylinder axis.

With such a configuration, a flat surface of a large area can be ensured in a most portion of the circumferential edge of the piston. Therefore, a homogeneous squish flow can be formed and homogeneous combustion can be realized.

In this configuration, it is further preferred that the bottom surface of the valve recess have an inclined surface that gradually decreases in height with increasing distance from the crankshaft axis in a region on a side of a boundary position corresponding to the center of the valve head of the intake valve which is farther from the crankshaft axis, and the lower surface of the valve head of the intake valve and the inclined surface of the valve recess be set parallel to each other.

With such a configuration, at least part of the bottom surface of the valve recess is an inclined surface parallel to the lower surface of the valve head of the intake valve. This is preferred from the standpoint of obtaining a high geometric compression ratio.

In this configuration, it is further preferred that the valve recess be connected, in a stepless manner, to the flat surface of the piston crown surface at a boundary position corresponding to the center of the valve head of the intake valve.

Such a configuration is preferred from the standpoint of ensuring a sufficient squish area and also obtaining a high geometric compression ratio.

In a different form of the configuration, a portion of the piston crown surface that faces the lower surface of the cylinder head positioned between the intake valve and the exhaust valve facing the intake valve, with the crankshaft axis being interposed therebetween, may be made a flat surface, and the bottom surface of the valve recess may be at a lower position, as a whole, than the flat surface.

With such a configuration, a step appears between the valve recess and the flat surface. Therefore, the intake air supplied to the combustion chamber from the circumferential edge of the valve head of the intake valve can be effectively prevented from directly flowing to the exhaust valve side.

In the combustion chamber structure, it is preferred that a sparkplug be provided between the two intake valves.

Where a sparkplug is thus disposed between the two intake valves, for example, when forced combustion by spark ignition is performed in a high-load range of the engine, the combustion rate can be increased.

In this configuration, it is more preferred that a sparkplug be provided between the two exhaust valves.

With such a configuration, the combustion rate during the aforementioned spark ignition combustion can be further increased.

In this configuration, it is further preferred that a depression connected to the cavity be provided under the sparkplug provided between the two intake valves and under the sparkplug provided between the two exhaust valve in the piston crown surface.

With such a configuration, the intake air supplied to the combustion chamber from the circumferential edges of the valve heads of the two intake valves is easily introduced into the cavity through the depressions for the sparkplugs, and the aforementioned scavenging of the cavity is further promoted.

INDUSTRIAL APPLICABILITY

The present invention can be especially advantageously used, for example, in the field of automotive engines.

The invention claimed is:

1. A combustion chamber structure for an engine that comprises: a cylinder block having one or more cylinders; a cylinder head that covers the cylinder from one side in a cylinder axis direction; a piston reciprocatingly inserted into the cylinder; intake valves provided at a ratio of two valves per cylinder at one side thereof from among two regions separated by a crankshaft axis; and exhaust valves provided at a ratio of two valves per cylinder at an opposite side thereof from among the two regions separated by the crankshaft axis, and that is adopted to the engine in which compressed self-ignition is performed in at least a low-load range, wherein
   a geometric compression ratio of the cylinder is set to 15 or higher;

a cavity is formed in a central portion of a crown surface of the piston;

a part of a valve head of each intake valve overlaps the cavity, as viewed in the cylinder axis direction;

valve recesses for preventing interference between the piston and the valve heads of the intake valves are formed in the piston crown surface so as to be connected to the cavity;

an axial line of the intake valve is inclined to recede from a cylinder axis with increasing distance from the valve head, as viewed in the cylinder axis direction, and a gap between the piston crown surface and a region which is a part of a lower surface of the valve head, at least on a side that is closer to the crankshaft axis, expands in accordance with an approach of the crankshaft axis; and a relationship of G2>G1 is fulfilled, where G1 stands for a minimum gap between a lower surface of the cylinder head that is positioned between the intake valve and the exhaust valve facing the intake valve, with the crankshaft axis being interposed therebetween, and the piston crown surface in a top dead center, and G2 stands for a gap between the lower surface of the valve head of the intake valve and the piston crown surface and at a position, along the lower surface of the valve head, closest to the crankshaft axis at a center timing of a valve overlap period in which the intake valve and the exhaust valve are both open.

2. The combustion chamber structure for the engine according to claim 1, wherein the valve recess is a first valve recess and a second valve recess provided individually correspondingly to the two intake valves, and a flat surface with a height larger than that of bottom surfaces of the two valve recesses is provided in a circumferential edge portion of the piston crown surface positioned between the first and second valve recesses.

3. The combustion chamber structure for the engine according to claim 1, wherein in a case in which the valve head of the intake valve is assumed to be cut by arbitrary cross sections which are orthogonal to a virtual line connecting the cylinder axis and a center of the valve head of the intake valve and parallel to the axial line of the intake valve, where each cross-sectional position is denoted by Si, a curtain surface area of the intake valve at the cross-sectional position Si is denoted by $\hat{Si}1$, and a gap surface area under the valve head at the cross-sectional position Si is denoted by $\hat{Si}2$, a relationship of $\hat{Si}2 \geq \hat{Si}1$ is fulfilled, where the "curtain surface area $\hat{Si}1$ at the cross-sectional position Si", as referred to herein, is an area defined by a shortest distance between a valve seat surface and the valve head that is to seat thereon at the center timing of the valve overlap period, and a length in a circumferential direction of an overlapping portion of a region on a side of the cross-sectional position Si that is farther from the cylinder axis and a third quadrant and a fourth quadrant of the valve head;

the "gap surface area $\hat{Si}2$ under the valve head at the cross-sectional position Si", as referred to herein, is a surface area defined by a length of a bottom side of a cross-sectional surface of the valve head in a case where the valve head is cut at the cross-sectional position Si at the center timing of the overlap period, and a distance from this bottom side to the piston crown surface facing the same;

the "third quadrant of the valve head", as referred to herein, is a region positioned at a largest distance from the cylinder axis in a case in which the valve head is divided into four regions by an X axis passing through the center of the valve head of the intake valve and orthogonal to the crankshaft axis, and an Y axis passing through the center of the valve head of the intake valve and parallel to the crankshaft axis, as viewed from the cylinder axis direction; and the "fourth quadrant of the valve head", as referred to herein, is a region adjacent to the third quadrant in the X-axis direction.

4. The combustion chamber structure for the engine according to claim 1, wherein at least a part of the piston crown surface excluding the valve recesses and the cavity is a first flat surface extending along a plane orthogonal to the cylinder axis; and a portion of the lower surface of the cylinder head that faces the first flat surface of the piston crown surface is a second flat surface extending along the plane orthogonal to the cylinder axis.

5. The combustion chamber structure for the engine according to claim 4, wherein a bottom surface of the valve recess has an inclined surface that gradually decreases in height with increasing distance from the crankshaft axis in a region on a side of a boundary position corresponding to a center of the valve head of the intake valve which is farther from the crankshaft axis; and the lower surface of the valve head of the intake valve and the inclined surface of the valve recess are set parallel to each other.

6. The combustion chamber structure for the engine according to claim 5, wherein the valve recess is connected, in a stepless manner, to the flat surface of the piston crown surface at a boundary position corresponding to the center of the valve head of the intake valve.

7. The combustion chamber structure for the engine according to claim 4, wherein the first flat surface includes a portion of the piston crown surface that faces the lower surface of the cylinder head positioned between the intake valve and the exhaust valve facing the intake valve, with the crankshaft axis being interposed therebetween, and a bottom surface of the valve recess is at a lower position, as a whole, than the portion of the first flat surface.

8. The combustion chamber structure for the engine according to claim 1, wherein a sparkplug is provided between the two intake valves.

9. The combustion chamber structure for the engine according to claim 8, wherein a sparkplug is provided between the two exhaust valves.

10. The combustion chamber structure for the engine according to claim 9, wherein a depression connected to the cavity is provided under the sparkplug provided between the two intake valves and under the sparkplug provided between the two exhaust valves in the piston crown surface.

* * * * *